US006952624B2

(12) United States Patent
Mori (10) Patent No.: US 6,952,624 B2
(45) Date of Patent: Oct. 4, 2005

(54) PRODUCTION SYSTEM AND PRODUCTION METHOD

(75) Inventor: Kazuhiro Mori, Osaka (JP)

(73) Assignees: Shigematsu Co., Ltd, Osaka (JP); Mori Industrial Engineering Laboratory, Osaka (JP); Ayami Tamai, Osaka (JP)

( * ) Notice: Subject to any disclaimer, the term of this patent is extended or adjusted under 35 U.S.C. 154(b) by 0 days.

(21) Appl. No.: 10/463,529

(22) Filed: Jun. 18, 2003

(65) Prior Publication Data

US 2004/0162628 A1 Aug. 19, 2004

(30) Foreign Application Priority Data

Feb. 18, 2003 (JP) ...................................... 2003-039898

(51) Int. Cl.[7] .............................................. G06F 19/00
(52) U.S. Cl. ...................................................... 700/116
(58) Field of Search ................... 700/115–117; 235/375

(56) References Cited

U.S. PATENT DOCUMENTS

| 5,831,859 A | * 11/1998 | Medeiros et al. ........... 700/218 |
| 2002/0180960 A1 | * 12/2002 | Koren et al. ............. 356/237.2 |
| 2003/0102367 A1 | * 6/2003 | Monette et al. ............. 235/376 |

FOREIGN PATENT DOCUMENTS

| JP | 56114650 | 9/1981 |
| JP | 1-246052 | 10/1989 |
| JP | 4-199304 | 7/1992 |
| JP | 7-200038 | 8/1995 |

OTHER PUBLICATIONS

English Language Abstract of JP 4–199304.
English Language Abstract of JP 1–246052.
English Language Abstract of JP 7–200038.

* cited by examiner

*Primary Examiner*—Leo Picard
*Assistant Examiner*—Alexander Kosowski
(74) *Attorney, Agent, or Firm*—Greenblum & Bernstein, P.L.C.

(57) ABSTRACT

Comprising: an IC tag 120 that is attached to a work in process 100 of a portable telephone 110 and memorizes information related to a production condition of the portable telephone 110; a mounting device 140 that reads out the information related to the production condition of the portable telephone 110 from the IC tag 120 and mounts components of the portable telephone 110, based on the readout information related to the production condition of the portable telephone 110, on the work in process 100 with the IC tag 120 attached; an inspection device 150 that reads out the information related to the production condition of the portable telephone 110 from the IC tag 120, and inspects the work in process 100, which the IC tag 120 is attached and the components of the portable telephone 110 are mounted, based on the readout information related to the production condition of the portable telephone 110; and an editing device 130 that writes the information related to production of the portable telephone 110 into the IC tag 120.

19 Claims, 9 Drawing Sheets

| Mounting condition | Screen | Exterior | Antenna | Button |
|---|---|---|---|---|
| Mounting condition 1 | Round | Flip | Stick | Round |
| Mounting condition 2 | Round | No flip | Round | Square |
| Mounting condition 3 | Square | No flip | Triangle | Round |
| Mounting condition 4 | Triangle | Flip | Square | Square |
| Mounting condition 5 | Square | Flip | Stick | Round |

| Production condition | Mounting condition | Inspection condition |
|---|---|---|
| Production condition 1 | Mounting condition 1 | Inspection condition 1 |
| Production condition 2 | Mounting condition 2 | Inspection condition 2 |
| Production condition 3 | Mounting condition 3 | Inspection condition 3 |
| Production condition 4 | Mounting condition 4 | Inspection condition 4 |
| Production condition 5 | Mounting condition 5 | Inspection condition 5 |
| Production condition 6 | Mounting condition 1 | Inspection condition 2 |
| Production condition 7 | Mounting condition 2 | Inspection condition 3 |
| Production condition 8 | Mounting condition 3 | Inspection condition 4 |

Fig. 8A — Image 1

Fig. 8B — Inspection condition 1
- Receive a radio wave by the antenna?
- Data can be input through the button?

Fig. 9

PRODUCTION SYSTEM AND PRODUCTION METHOD

BACKGROUND OF THE INVENTION (1) Field of the Invention

The present invention relates to a production system and a production method using a noncontact IC tag.

(2) Description of the Related Art

In recent years, though manufacturers are required to produce a variety of products due to diversification of values among consumers, production of plural kinds of products deteriorates an operating rate of a production line. Therefore, under current circumstances that requires cost reduction in various fields such as manufacturing and services, the manufacturers cannot easily pursue production of multiple kinds of products.

As a prior art to resolve the above problem, there is an invention called "Production method for plural types of products" (Refer to Japanese Laid-Open Patent Application No. S56-114650 as an example). Aiming at producing plural types of products easily, this prior art suggests to group products by those having the same combination of processes and the same processing order, provide a storage unit for controlling a work in process (a partly-finished item) by each group between the processes, and produce plural kinds of products through the storage unit.

However, in the conventional production methods, since the products are grouped by those having the same combination of processes and the same processing order, a group step must be added. Also, because production is performed by each group, a step for storing each work in process must be added as well between the processes. Because producing plural kinds of products costs more than producing a single kind of products, the manufacturers cannot easily produce plural kinds of products.

Besides, in the conventional production method, plural kinds of products are supposed to be produced by changing a pattern of the combination of processes, so that it cannot cope with a situation when contents of the processes need to be changed for each product. To be more specific, in the conventional production methods, though it is possible to produce a product X produced through processes A→B→C and a product Y produced through processes A→C→B at the same time, it is not possible to produce the product X produced through processes A→B→C and a product Z produced through processes A→E→C at the same time. These are based on a production management idea, which presets a production condition at a production device side and produces products that are met with the preset condition.

SUMMARY OF THE INVENTION

In view of the above-mentioned problems, the present invention provides a production system and a method thereof based on a new idea for having each product hold its individual assembly and inspection data, and having the product on a production line demand components and inspections necessary for the product from a production device, rather than having the production device side hold production data in advance. Therefore, the present invention aims at providing, firstly, a production system that can easily produce plural types of products, and secondly, a production system that can easily produce products having different contents of processes.

In order to achieve above objectives, the production system related to the present invention is a production system comprising a noncontact IC tag and a production device, wherein the noncontact IC tag is attached to a work in process of a product, and operable to memorize production condition information related to a production method of the product, and the production device includes a production condition information reading unit operable to read out the production condition information from the noncontact IC tag, and a production unit operable to produce, based on the readout production condition information, the product from the work in process with the noncontact IC tag attached.

In this way, because the production device produces the product based on production condition information read from the noncontact IC tag attached to the work in process, it authorizes the product to decide its own specification, and thereby a new product-driven production system can be realized, which never existed before.

Also, the production device may further include a production method display unit operable to display content of the readout production condition information.

In this way, since a user of the production device can view a production method for the product and produces the product from the work in process accordingly, plural types of products can be easily produced and two different products having different contents of processes can be easily produced, which are beneficial effects.

Additionally, the noncontact IC tag may memorize image data related to the content of the production condition information corresponding to the production condition information, and the production method display unit may display the content of the production condition information through an image based on the image data.

In this way, because the user of the production device can confirm the production method for the product through the image in the processes to produce the product from the work in process, there is an effect that the product can be produced accurately from the work in process.

Also, the production device may memorize image information corresponding to the image data, and the production method display unit may display the content of the production condition information through an image according to the image information corresponding to the image data.

In this way, since the noncontact IC tag does not need to memorize the image data, a workload of the noncontact IC tag is reduced, which is a significant effect.

Also, the production device may further include an image information memory unit operable to memorize a plurality of the image information, and an image information writing unit operable to write any of the plurality of the image information into the noncontact IC tag.

In this way, because the production device can register a new production condition on the noncontact IC tag, a new product can be easily produced.

Moreover, the production device may further include a production condition information memory unit operable to memorize a plurality of the production condition information, and a production condition information writing unit operable to write any of the plurality of the production condition information into the noncontact IC tag.

In this way, because the production device can generate the new production data, ideas for new products can be quickly and easily reflected on the production, and thereby it is possible for the manufacturers to respond to a market that demands new products all the time.

The present invention is not only realized as a production system, but also realized as a production method having characteristic means equipped with the said production system be as steps, or realized as a program that has a computer execute these steps. And, it is obvious that such program may be distributed through a recording media such as a CD-ROM or a transmission media such as the Internet.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The following describes a portable telephone production system according to an embodiment of the present invention with reference to diagrams.

Figure 1:
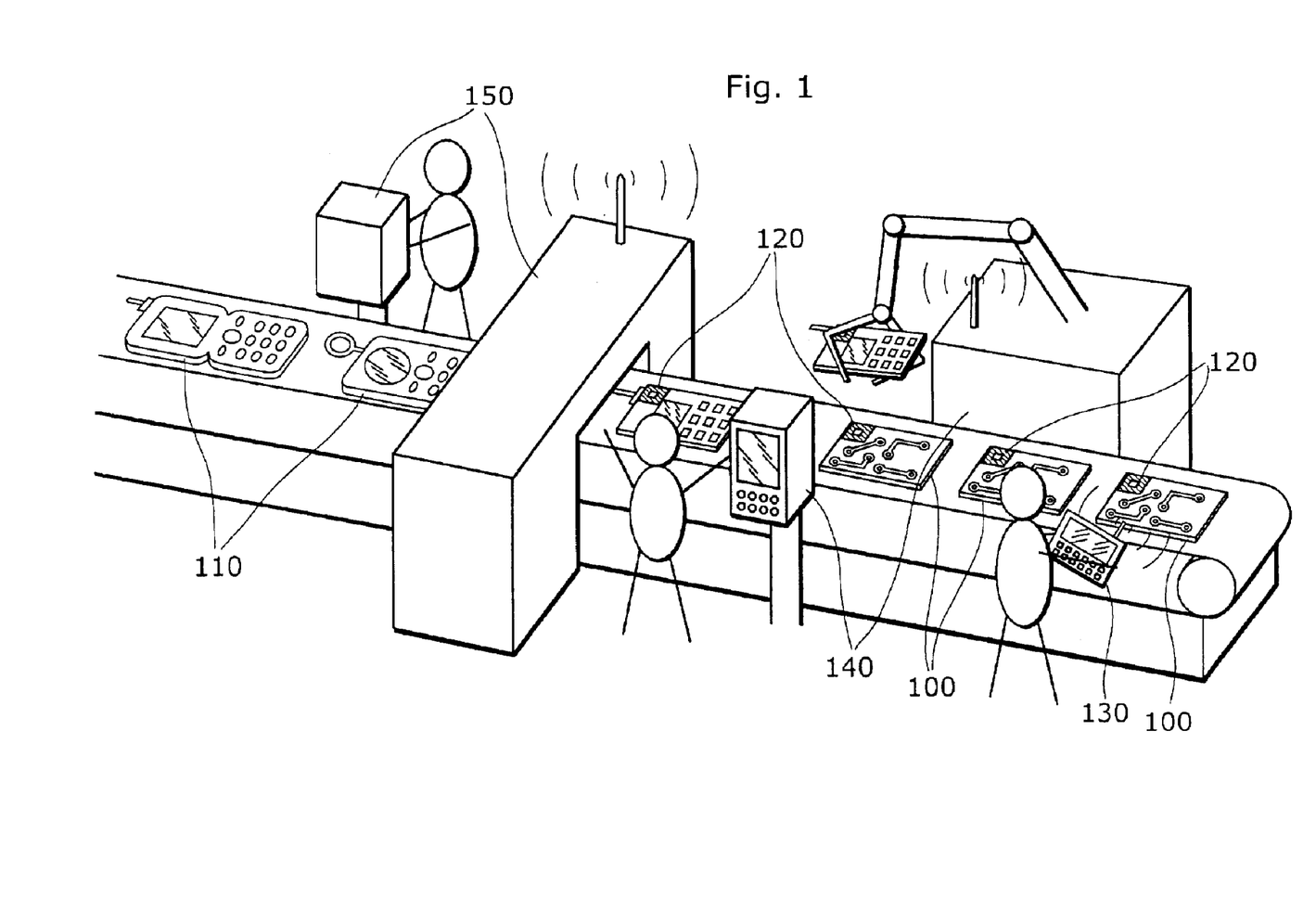
FIG. 1 is a system configuration diagram showing a usage status of the production system according to an embodiment of the present invention.

FIG. 1 is a system configuration diagram showing a usage status of the portable telephone production system according to the embodiment of the present invention.

The portable telephone production system according to this embodiment is a product-driven production system, which authorizes a work in process, not a production device, to decide a specification of the product. It aims at producing plural types of a portable telephone 110 from a work in process 100 in a production line where the portable telephone 110 is produced as a finished product from the work in process 100 like a printed circuit board with an electric component mounted, which comprises the work in process 100 like a printed circuit board, the portable telephone 110 produced from the work in process 100, an IC tag 120 attached to the work in process 100, an editing device 130 that writes production condition information related to a production condition of the portable telephone 110 to the IC tag 120, a mounting device that mounts a component of the portable telephone 110 on the work in process 100 with the IC tag 120 attached, and an inspection device 150 that inspects the work in process 100 with the component of the portable telephone 110 mounted.

Figure 2:
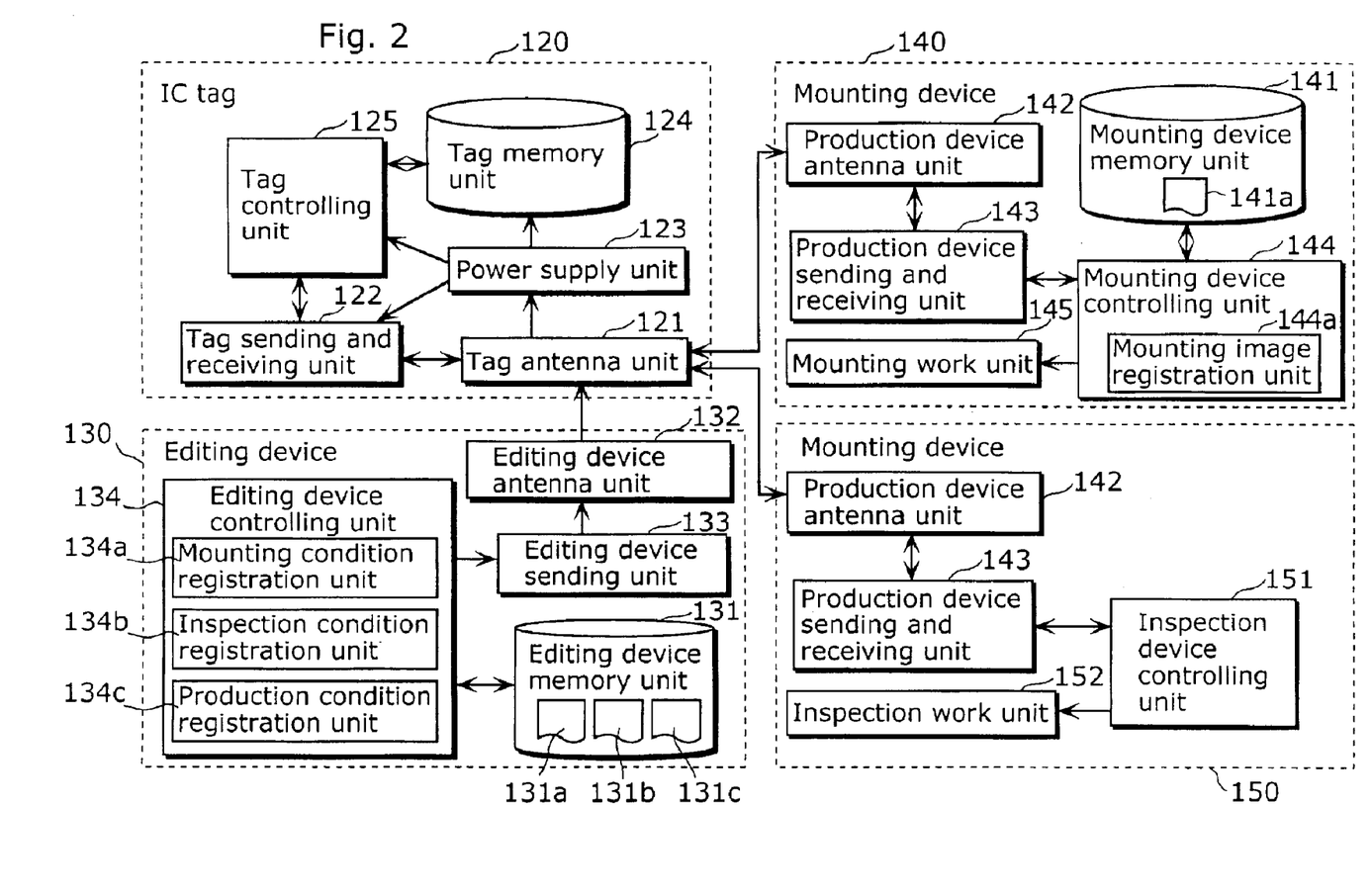
FIG. 2 is a block diagram showing the configuration of the system.

FIG. 2 is a block diagram showing an internal configuration of the production system according to the embodiment of the present invention.

The editing device 130 is to memorize the production condition information and to write the memorized production condition information in the IC tag 120, which functionally comprises an editing device memory unit 131, an editing device antenna unit 132, an editing device sending unit 133 and an editing device controlling unit 134.

The editing device memory unit 131 memorizes a mounting condition table 131a, an inspection condition table 131b and a production condition table 131c.

Figure 3:
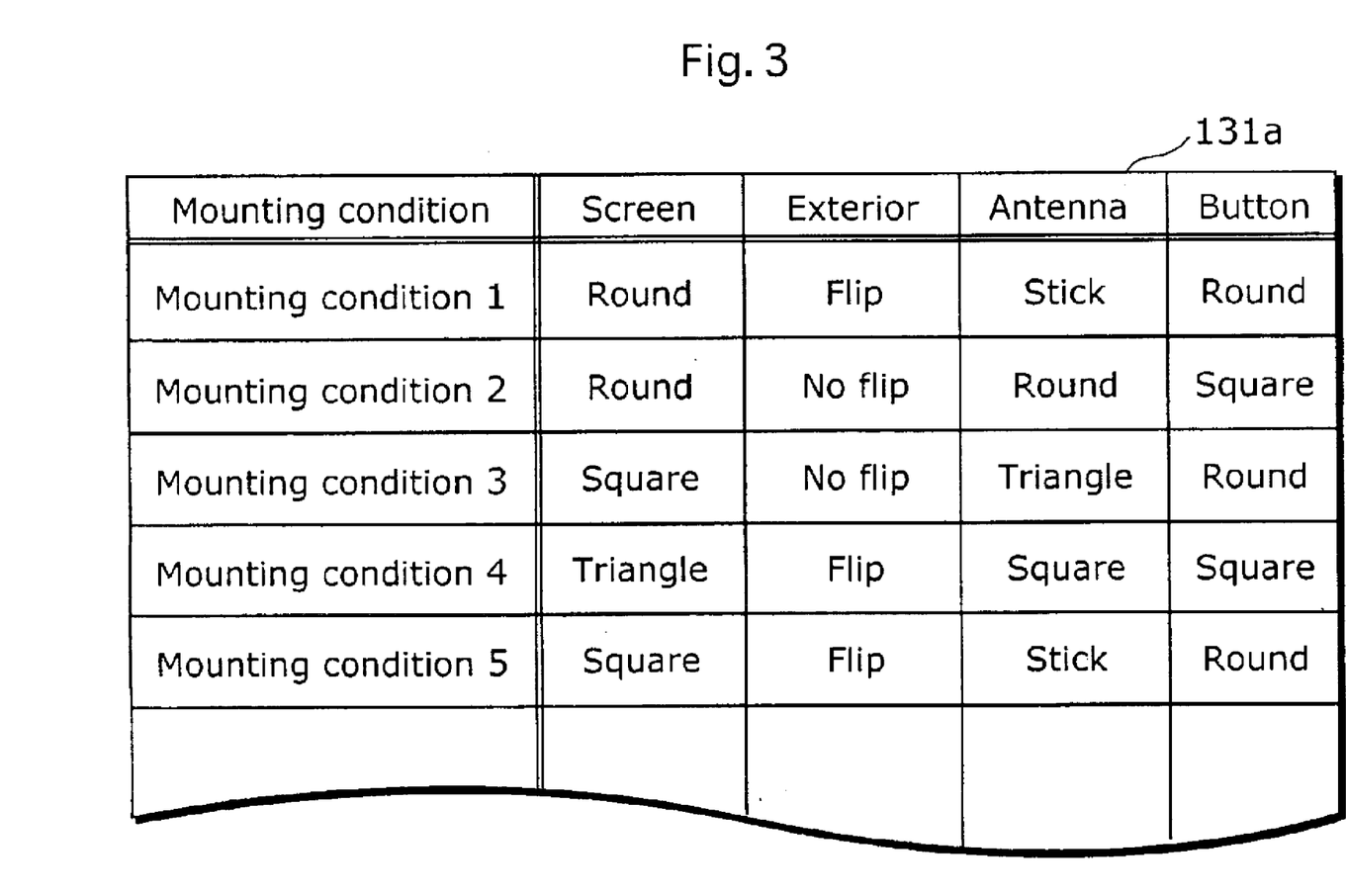
FIG. 3 is a table diagram showing contents of a mounting condition table in the system.

As shown in this FIG. 3, the mounting condition table 131a is composed of plural number of mounting condition data. In each of the mounting condition data, mounting contents of the components of the portable telephone 110, which are mounted on the work in process 100 for producing the portable telephone 110 from the work in process 100, are registered. The mounting contents of the components of the portable telephone 110 are a combination showing what type of screen, exterior, antenna and button are mounted. For example, content such as "Mount a round screen, a flip type exterior, a stick type antenna and a round button on the work in process 100" is registered on "Mounting condition 1" in the mounting condition data.

Figure 4:
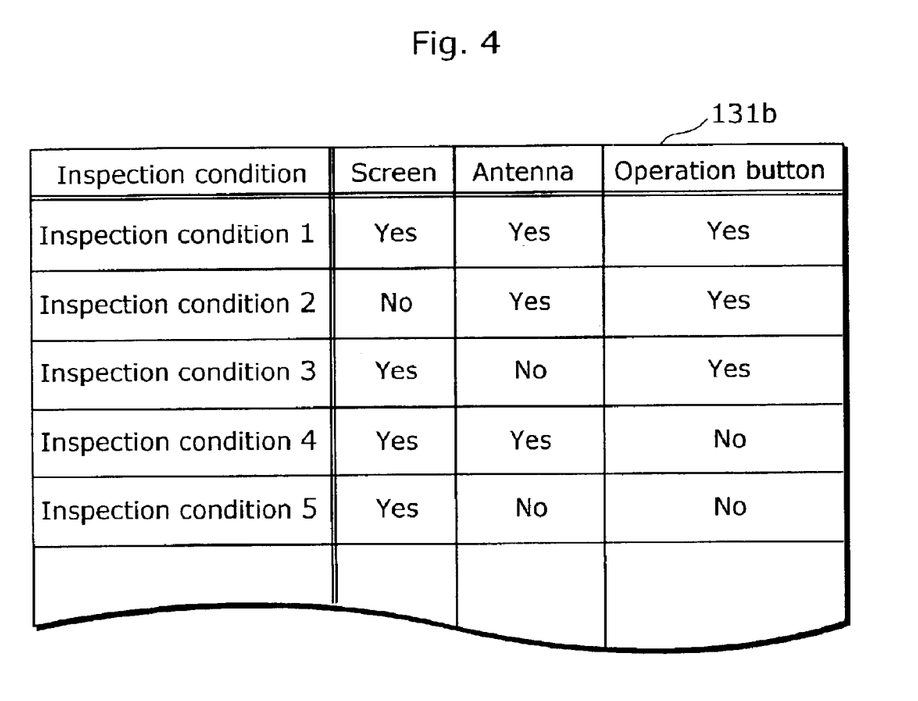
FIG. 4 is a table diagram showing contents of an inspection condition table in the system.

FIG. 4 is a table diagram showing contents of the inspection condition table 131b.

As shown in this FIG. 4, the inspection condition table 131b is composed of plural number of inspection condition data. In each of the inspection condition data, contents of an inspection executed to the work in process 100, which the components of the portable telephone 110 are mounted on to produce the portable telephone 110 from the work in process 100, are registered. The inspection contents are a combination of inspections whether images and characters are displayed on the screen, whether the antenna can receive a radio wave, and whether data can be input through an operation button. For example, contents such as "Inspect the work in process 100 with components of the portable telephone 110 mounted, whether images and characters are displayed, and whether the antenna can receive a radio wave" are registered on "Inspection condition 4" in the inspection condition data. Here, in the inspection condition table 131b, "Yes" indicates to do the inspection whereas "No" shows not to do the inspection.

Figure 5:
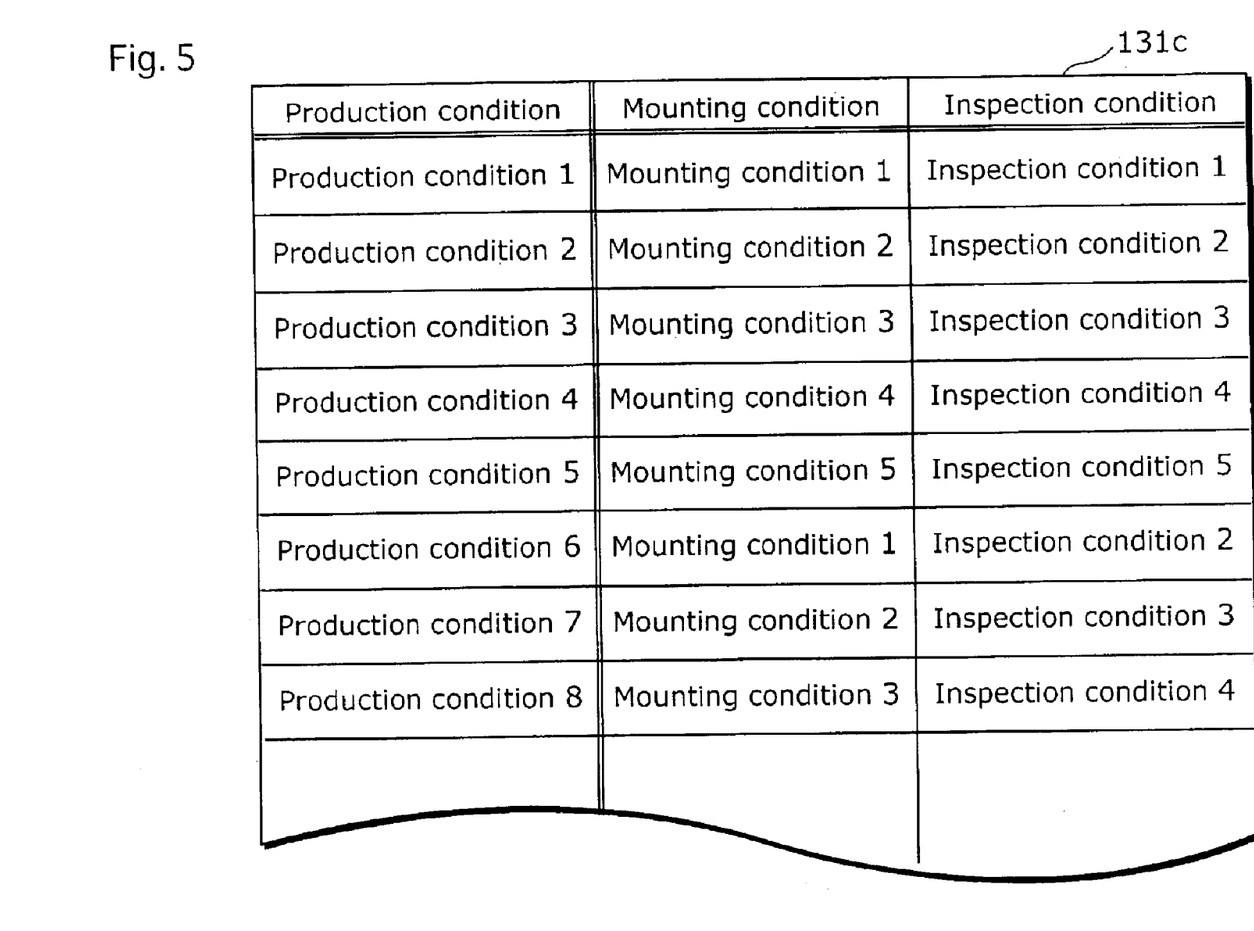
FIG. 5 is a table diagram showing contents of a production condition table in the system.

FIG. 5 is a table diagram showing contents of the production condition table 131c.

As shown in this FIG. 5, the production condition table 131c is composed of plural number of production condition information, and the mounting condition data and the inspection condition data are contained in each of the production condition information. For example, the production condition information set as "Production condition 1" contains "Mounting condition 1" as the mounting data and "Inspection condition data 1" as the inspection condition data, and content such as "Mount a round screen, a flip type exterior, a stick type antenna and a round button on the work in process 100, and inspect the work in process 100 with the components mounted, whether images and characters are displayed on the screen, whether a radio wave is received by the antenna, and whether data can be input through its operation button" is registered (See FIGS. 3 and 4). FIG. 3 illustrates mounting contents such as a screen, an exterior, an antenna and a button are registered on the mounting condition data composing of the production condition information. FIG. 4 illustrates inspections whether images and characters are displayed on the screen, whether a radio wave can be received by the antenna, and whether data can be input through the operation button are registered as inspection contents on the inspection condition data. But, because the production condition information in the present embodiment is memorized in the IC tag 120, the production condition information can be relatively large data. In short, the mounting condition data and the inspection condition data, which compose of the production condition information, may be more complicated data. For example, several tens of patterns of mounting contents may be registered on the mounding condition data, and several tens of patterns of inspection contents may be registered on the inspection condition data.

The editing device antenna unit 132 is a coil antenna or the like, which sends a radio wave containing the production condition information in a specific frequency and a writing command to the IC tag 120. The writing command here is a signal that instructs the IC tag 120 to memorize the production condition information.

The editing device sending unit 133 is composed of a modulation circuit, a demodulation circuit and the like, which receives the writing command and the production condition information from the editing device controlling unit 134, modulates the received writing command and production condition information to signals in a specific frequency, and sends them to the editing device antenna unit 132.

The editing device controlling unit 134 displays a list of the production condition information contained in the production condition table 131c memorized in the editing device memory unit 131 on a display device, selects production condition information from the list of the production condition information through the operation device (not shown in diagrams), and sends the selected production condition information and writing command to the editing device sending unit 133. Also, the editing device controlling unit 134 includes a mounting condition registration unit 134a, an inspection condition registration unit 134b and a production condition registration unit 134c, generates new mounding condition data by the mounting condition registration unit 134a, generates new inspection condition data by the inspection condition registration unit 134b, and generates new production condition information by the production condition registration unit 134c.

The IC tag 120 is detachable from the work in process 100 and has a sheet type shape of 30 mm×30 mm with approx. 1 mm in thickness, which memorizes the production condition information and sends the memorized production condition information to the mounting device 140 and the inspection device 150. The IC tag 120 functionally comprises a tag antenna unit 121, a tag sending and receiving unit 122, a power supply unit 123, a tag memory unit 124 and a tag controlling unit 125.

The tag antenna unit 121 is a coil antenna or the like, receives a radio wave containing a reading command in a specific frequency, generates AC electricity through an electromagnetic induction method or the like while receiving the radio wave, supplies the AC electricity to the power supply unit 123, and sends the production condition information to the mounting device 140 and the inspection device 150 as the radio wave in the specific frequency. Here, the reading command is a signal that instructs the IC tag 120 to send the production condition information. The tag antenna unit 121 receives a radio wave containing the production condition information in a specific frequency and a writing command, generates AC electricity through the electromagnetic induction method or the like while receiving the radio wave, and supplies the AC electricity to the power supply unit 123. In this case, the AC electricity does not need to be generated through the electromagnetic induction method.

The tag sending and receiving unit 122 is composed of a modulation circuit, a demodulation circuit or the like, demodulates the radio wave in the specific frequency received by the tag antenna unit 121, reproduces the writing command, the reading command and the production condition information, and sends the reproduced writing command, reading command and production condition information to the tag controlling unit 125. The tag sending and receiving unit 122 receives the production condition information from the tag controlling unit 125, modulates the received production condition information to a signal in a specific frequency, and sends it to the tag antenna unit 121.

The power supply unit 123 generates DC electricity from the supplied AC electricity, and supplies it to the tag sending and receiving unit, the tag memory unit 124 and the tag controlling unit 125.

The tag memory unit 124 is composed of a nonvolatile memory such as EEPROM, FERAM, MRAM or the like, and memorizes the production condition information.

The tag controlling unit 125 receives the production condition information from the tag memory unit 124 based on the reading command. The controlling unit 125 replaces the production condition information memorized in the tag memory unit 124 with the production condition information received from the tag sending and receiving unit 122 according to the writing command.

The mounting device 140 receives the production condition information from the IC tag 120, mounts the components of the portable telephone 110, according to the production condition information, on the work in process 100 with the IC tag attached, which functionally comprises a mounting device memory unit 141, a production device antenna unit 142, a production device sending and receiving unit 143, a mounting device controlling unit 144 and a mounting work unit 145.

The mounting device memory unit 141 memorizes a mounting image table 141a.

Figure 6:
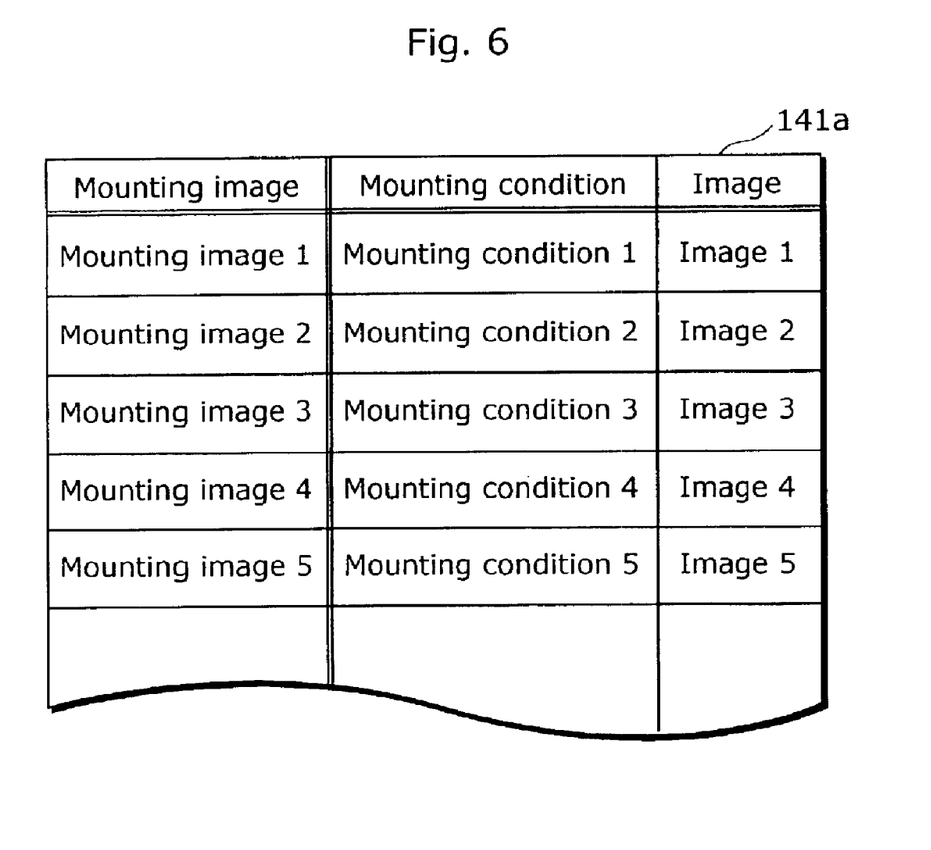
FIG. 6 is a table diagram showing contents of a mounting image table in the system.

FIG. 6 is a table diagram to show contents of the mounting image table 141a.

As shown in this FIG. 6, the mounting image table 141a is composed of plural number of mounting image information, and each of the mounting image information contains mounting condition data and image data related to an image of the work in process 100 with the components mounted according to the mounting condition data. For example, "Mounting image 1" in the mounting image includes "Mounting condition 1" as the mounting condition data and "Image 1" as the image data related to the image of the work in process 100, which a round screen, a flip type exterior, a stick type antenna and a round type button are mounted (See FIG. 3).

The production device antenna unit 142 is a coil antenna or the like, which sends a radio wave containing the reading command in a specific frequency to the IC tag 120, and receives a radio wave containing the production condition information in a specific frequency from the IC tag 120.

The production device sending and receiving unit 143 is composed of a modulation circuit, a demodulation circuit and the like, which receives a reading command from the mounting device controlling unit 144, modulates the received reading command to a signal in a specific frequency, and sends it to the production device antenna unit 142. The production device sending and receiving unit 143 demodulates the radio wave in the specific frequency received by the production device antenna unit 142, and reproduces the production condition information.

The mounting device controlling unit 144 sends the reading command to the production device sending and receiving unit 143, receives the production condition information from the production device sending and receiving unit 143, receives mounting image information from the mounting device memory unit 141 according to the mounting condition data contained in the received production condition information and the mounting image table 141a memorized in the mounting device memory unit 141, displays content of the received mounting image information on a display device (not shown in the diagrams), and sends the mounting condition data contained in the received production condition information to the mounting work unit 145.

The mounting work unit 145 holds NC data corresponding to plural number of the mounting condition data in advance, and mounts components of the portable telephone 110 on the work in process 100 with the IC tag 120 attached, according to the mounting condition data received from the mounting device controlling unit 144. Here, contents of actions taken by the mounting work unit 145, which are for mounting the components of the portable telephone 110 on the work in process 100, are registered on the NC data. The contents of the actions are a combination of an action for selecting the components of the portable telephone 110 and an action for mounting the selected components of the portable telephone 110 on the work in process 100. For example, in the NC data corresponding to "Mounting condition 1" of the mounting condition data, an action for selecting a round screen, a flip type exterior, a stick type antenna and a round type button, and an action for mounting the round screen, the flip type exterior, the stick type antenna and the round type button on the work in process 100 are registered.

The inspection device 150 receives the production condition information from the IC tag 120, and inspects the work in process 100, which the IC tag 120 is attached and the components of the portable telephone 110 are mounted, according to the received production condition information. The inspection device 150 functionally comprises the production device antenna unit 142, the production device sending and receiving unit 143, an inspection device controlling unit 151 and an inspection work unit 152. Since the same reference numbers are assigned to components functionally same as those of the mounting device 140, their description is omitted here.

The inspection device controlling unit 151 sends the reading command to the production device sending and receiving unit 143, receives the production condition information from the production device sending and receiving unit 143, displays contents of the inspection condition data contained in the received production condition information to a display device (not shown in the diagrams), and sends the received inspection condition data to the inspection work unit 152.

The inspection work unit 152 holds NC data corresponding to plural number of the inspection condition data in advance, and inspects the work in process 100, which the IC tag 120 is attached and the components of the portable telephone 110 are mounted, according to the inspection condition data received from the inspection device controlling unit 151. Here, in the NC data, contents of actions taken by the inspection work unit 152, which are for inspecting the work in process 100 with the components of the portable telephone 110 mounted, are registered. The contents of the actions are a combination of an action for identifying inspection points and an action for inspecting the identified inspection points. For example, in the NC data corresponding to "Inspection condition 1" of the inspection condition data, an action for identifying the screen, the antenna and the operation button of the work in process 100, which the components of the portable telephone 110 are mounted, and an action for executing inspections whether images and characters are displayed on the screen, whether a radio wave can be received by the antenna, and whether data can be input through the button, are registered.

Figure 7:
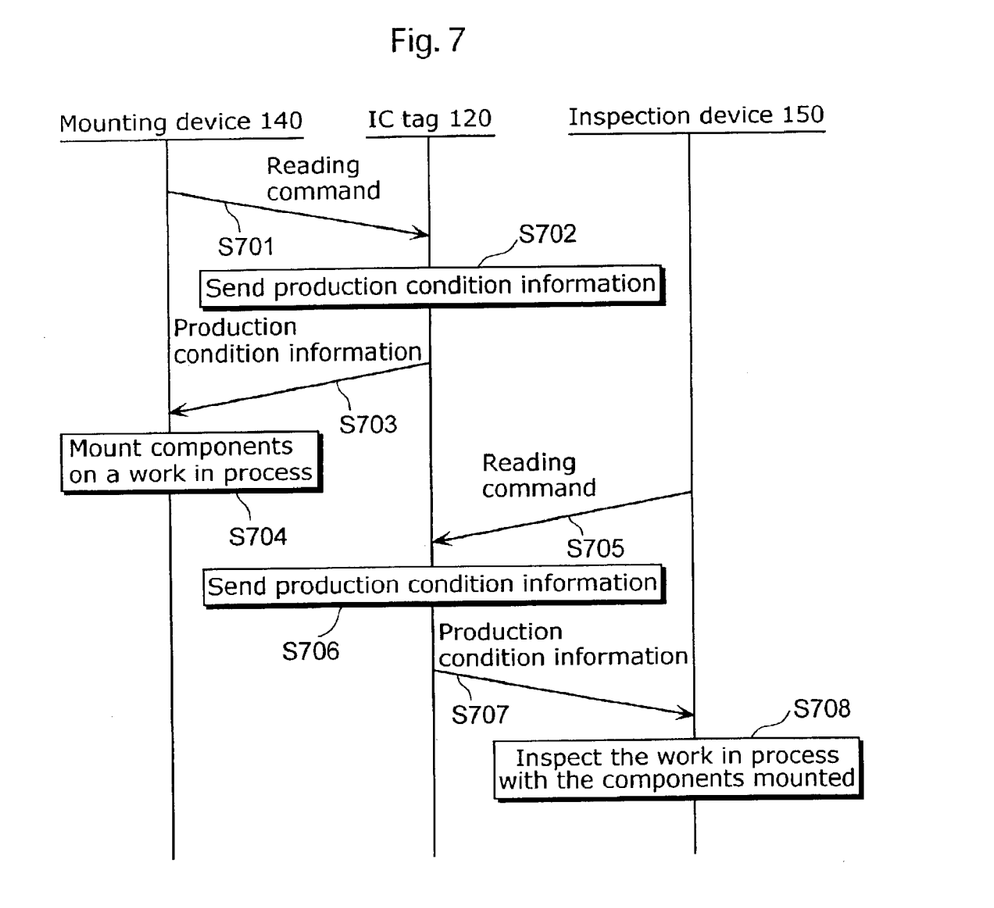
FIG. 7 is a sequence diagram showing actions for portable telephone production in the system.

Along with a sequence indicated in FIG. 7, the following sequentially describes actions of the portable telephone production system (flows of the portable telephone production in the present system) according to the embodiment of the present invention structured as above.

The mounting device 140 keeps sending a radio wave containing the reading command in a specific frequency for a specific period of time to the IC tag 120 attached to the work in process 100 in a process for mounting the components of the portable telephone 110 on a production line for producing the portable telephone 110 from the work in process 100 such as a printed circuit board or the like with the electric components mounted (Step S701). Here, the specific period of time means time sufficiently allowed for the mounting device 140 to receive the production condition information from the IC tag 120.

The tag antenna unit 121 of the IC tag 120 attached to the work in process 100 receives a radio wave containing a reading command in a specific frequency, generates AC electricity, and supplies the AC electricity to the power supply unit 123. The power supply unit 123 generates DC electricity from the AC electricity, and supplies it to the tag sending and receiving unit 122, the tag memory unit 124 and the tag controlling unit 125. The tag sending and receiving unit 122 demodulates the radio wave in the specific frequency received by the tag antenna unit 121, reproduces the reading command, and sends the reproduced reading command to the tag controlling unit 125. The tag controlling unit 125 receives the production condition information from the tag memory unit 124 according to the reading command, and sends it to the tag sending and receiving unit 122 (Step S702).

The tag sending and receiving unit 122 modulates the received production condition information to a signal in a specific frequency, and sends it to the tag antenna unit 121. The tag antenna unit 121 sends the production condition information to the mounting device 140 as a radio wave in a specific frequency (Step S703).

The production device antenna unit 142 of the mounting device 140 receives the radio wave containing the production condition information in the specific frequency. The production device sending and receiving unit 143 demodulates the radio wave in the specific frequency received by the production device antenna unit 142, reproduces the production condition information, and sends the reproduced production condition information to the mounting device controlling unit 144. The mounting device controlling unit 144 receives mounting image information from the mounting device memory unit 141 according to mounting condition data contained in the received production condition information and the mounting image table 141a memorized in the mounting device memory unit 141, displays contents of the received mounting image information to the display device, and sends the mounting condition data contained in the received production condition information to the mounting work unit 145. The mounting work unit 145 mounts the components of the portable telephone 110 on the work in process 100 with the IC tag 120 attached, according to the NC data corresponding to the received mounting condition data (Step S704). For example, when the mounting device 140 receives "Production condition 1" as the production condition information from the IC tag 120 attached to the work in process 100, the mounting device controlling unit 144 receives "Mounting image 1" as the mounting image information, which contains "Production condition 1" as the mounting condition data, from the mounting device memory unit 141, displays the contents of the received "Mounting image 1" as the mounting image information on the display device. The mounting work unit 145 selects a round screen, a flip type exterior, a stick type antenna and a round type button, and mounts the selected round screen, flip type exterior, stick type antenna and round type button on the work in process 100 (See FIGS. 3, 5 and 6).

Figure 8A:
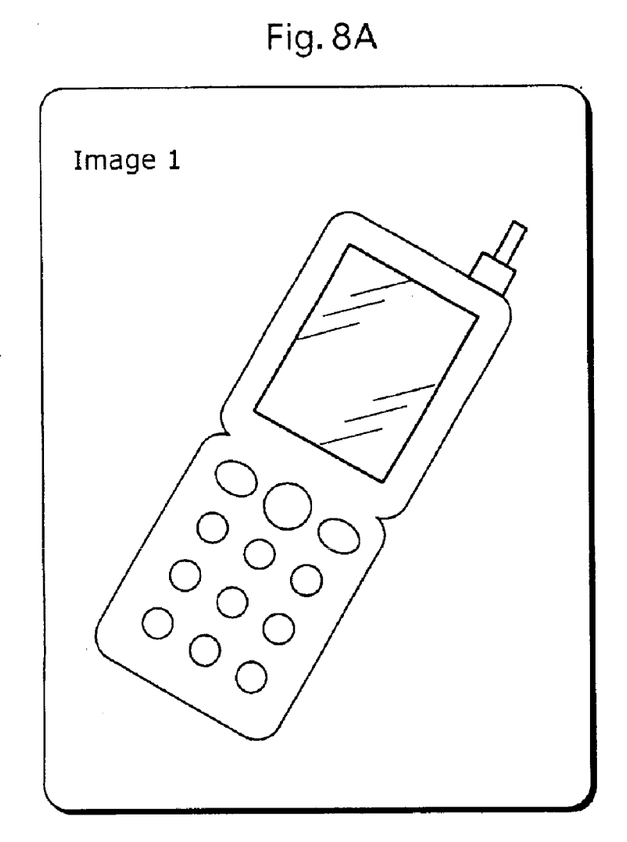
FIG. 8A is a diagram showing contents displayed when a mounting device 140 receives production condition information set as "production condition 5" from an IC tag 120 attached to a work in process 100 in the system.

Here, contents displayed on the display device of the mounting device 140 are indicated in FIG. 8A.

FIG. 8A shows contents displayed in the display device when the mounting device 140 receives "Production condition 5" as the production condition information from the IC tag 120 attached to the work in process 100. The displayed contents consist of an image of the work in process 100 with the components mounted. In this case, the mounting device controlling unit 144 displays an image of the portable telephone 110 that is equipped with the round screen, the flip type exterior, the round button and the stick type antenna on the display device (See FIGS. 3 and 6).

The inspection device 150 is in a process of the inspection, and keeps sending a radio wave in a specific frequency, which includes the reading command for a specific period of time to the IC tag 120 attached to the work in process 100 with the components of the portable telephone 110 mounted (Step S705). The specific period of time here means time sufficiently allowed for the inspection device 150 to receive the production condition information from the IC tag 120.

The tag antenna unit 121 of the IC tag 120 attached to the work in process 100 receives the radio wave containing the reading command in the specific frequency, generates AC electricity, and supplies the AC electricity to the power supply unit 123. The power supply unit 123 generates DC electricity from the AC electricity, and supplies it to the tag sending and receiving unit 122, the tag memory unit 124 and the tag controlling unit 125. The tag sending and receiving unit 122 demodulates the radio wave in the specific frequency received by the tag antenna unit 121, reproduces the reading command, and sends the reproduced reading command to the tag controlling unit 125. The tag controlling unit 125 receives the production condition information from the tag memory unit 124 according to the reading command, and sends it to the tag sending and receiving unit 122 (Step S706).

The sending and receiving unit 122 modulates the received production condition information to a signal in a specific frequency, and sends it to the tag antenna unit 121. The tag antenna unit 121 sends the production condition information to the inspection device 150 as a radio wave in a specific frequency (Step S707).

The production device antenna unit 142 of the inspection device 150 receives the radio wave in the specific frequency, which includes the production condition information. The production device sending and receiving unit 143 demodulates the radio wave in the specific frequency received by the production device antenna unit 142, reproduces the production condition information, and sends the reproduced production condition information to the inspection device controlling unit 151. The inspection device controlling unit 151 displays contents of inspection condition data included in the received production condition information on the display device, and sends the received inspection condition data to the inspection work unit 152. The inspection work unit 152 inspects the work in process 100, which the IC tag 120 is attached and the components of the portable telephone 110 are mounted, according to the NC data corresponding to the received inspection condition data (Step S708). For example, when the inspection device 150 receives "Production condition 1" as the production condition information from the IC tag 120 attached to the work in process 100, which the components of the portable telephone 110 are mounted, the inspection device controlling unit 151 displays contents of "inspection condition 1" as the inspection condition data on the display device. Then, the inspection work unit 152 identifies the screen, the antenna and the operation button of the work in process 100 with the components of the portable telephone 110 mounted, and executes inspections whether images and characters are displayed on the screen, whether a radio wave can be received by the antenna, and whether data can be input through the operation button (See FIGS. 4 and 5).

Figure 8B:
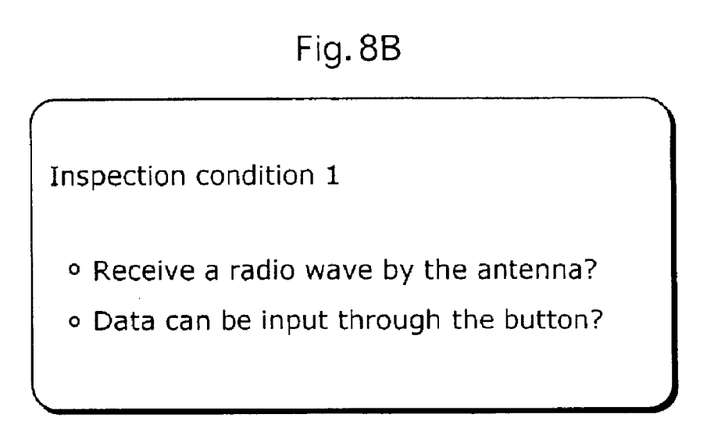
FIG. 8B is a diagram showing contents displayed when an inspection device 150 receives production condition information set as "production condition 2" from the IC tag 120 attached to the work in process 100 in the system.

Here, contents displayed on the display device of the inspection device 150 are indicated in FIG. 8B.

FIG. 8B shows contents displayed on the display device when the inspection device 150 receives "Production condition 2" as the production condition information from the IC tag 120 attached to the work in process 100 with the components of the portable telephone 110 mounted. The displayed contents consist of inspection contents registered on the inspection condition data. In this case, the inspection device controlling unit 151 displays messages "Receive a radio wave by the antenna?", and "Data can be input through the button?" are displayed on the display device (See FIGS. 4 and 5).

Next, the following describes how the mounting condition data, the inspection condition data, the production condition information and the mounting image information are newly generated.

The editing device controlling unit 134 generates the new mounting condition data through the mounting condition registration unit 134a, and adds the newly generated mounting condition data to the mounting condition table 131a memorized in the editing device memory unit 131. For example, when the mounting condition data is newly generated for mounting a triangle screen, a flip type exterior, a triangle antenna, and a square button on the work in process 100, the editing device controlling unit 134 generates the new mounting condition data by specifying "Triangle" for a "screen" field, "Flip" for an "exterior" field, "Triangle" for an "antenna" field and "Square" for a "button" field in the mounting condition data through the mounting condition registration unit 134a, and adds this mounting condition data to the mounting condition table 131a memorized in the editing device memory unit 131.

The editing device controlling unit 134 includes the inspection condition registration unit 134b, generates new inspection condition data through the inspection condition registration unit 134*b*, and adds the newly generated inspection condition data to the inspection condition table 131*b* memorized in the editing device memory unit 131. For example, when the inspection condition data is newly registered for inspecting the work in process 100, which the components of the portable telephone 110 are mounted, whether the images and characters are displayed on the screen and whether a radio wave is received by the antenna, the editing device controlling unit 134 generates new inspection condition data by specifying "Yes" in a "screen" field, "Yes" in an "antenna" field and "Yes" in an "operation" field of the inspection condition data through the inspection condition registration unit 134*b*, and adds this inspection condition data to the inspection condition table 131*b* memorized in the editing device memory unit 131.

The editing device controlling unit 134 includes the production condition registration unit 134*c*, generates new production condition information through the production condition registration unit 134*c*, and adds the newly generated production condition information to the production condition table 131*c* memorized in the editing device memory unit 131. For example, when new production condition information is newly generated for mounting a triangle screen, a flip type exterior, a square antenna and a square button on the work in process 100, and for inspecting the work in process 100 with the components mounted whether images and characters are displayed on the screen, whether a radio wave can be received by the antenna, and whether data can be input through the operation button, the editing device controlling unit 134 generates new production condition information by specifying "Mounting condition 4" for a "Mounting condition" field, "Inspection condition 1" for an "Inspection condition" field in the production condition table 131*c* through the production condition registration unit 134*c*, and adds the production condition information to the production condition table 131*c* memorized in the editing device memory unit 131 (See FIGS. 3 and 4).

The mounting device controlling unit 144 generates new mounting image information through the mounting image registration unit 144*a*, and has the mounting device memory unit 141 memorize the newly generated mounting image information. For example, when the mounting device controlling unit 144 newly generates the mounting image information for displaying contents of the mounting condition data on the display device with an image by receiving the mounting condition data set as "Mounting condition 4", the mounting device controlling unit 144 generates "Image 4" as image data through the mounting image registration unit 144*a* for the work in process 100 with a triangle screen, an flip type exterior, a square antenna and a square button mounted, generates new mounting image information by specifying "Image 4" for the "Image" field and "Mounting condition 4" for the "Mounting condition" field, and adds the mounting image information to the mounting image table 141*a* memorized in the mounting device memory unit 141 (See FIG. 3).

Figure 9:
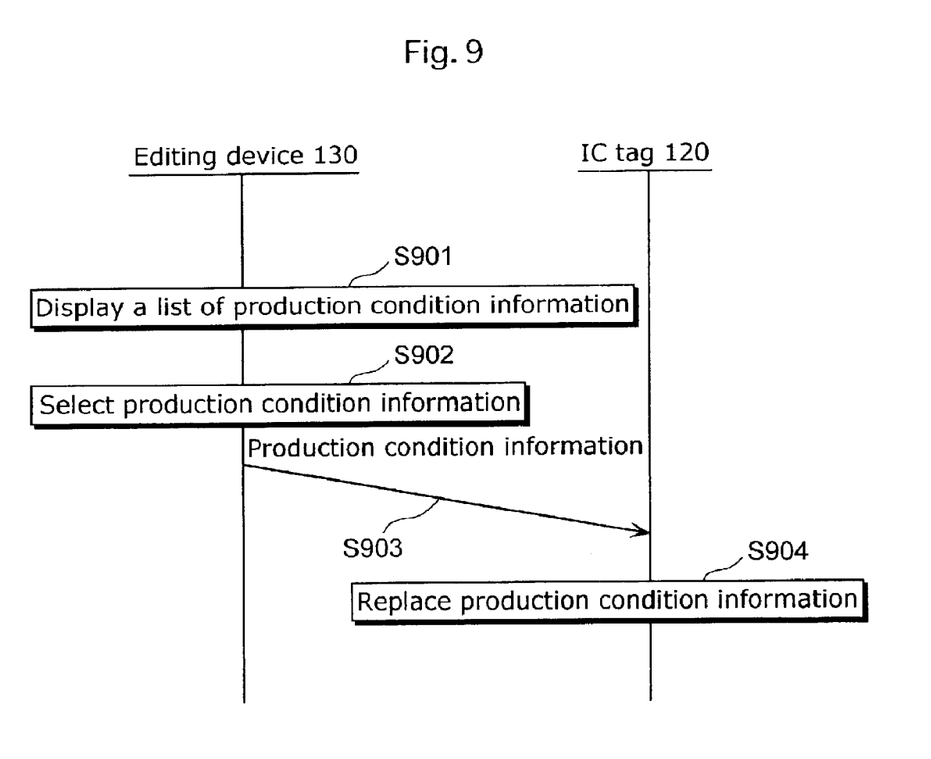
FIG. 9 is a sequence diagram showing a writing action of new production condition information in the system.

Next, the following sequentially describes actions of the production system (flows for writing the production condition information of the present system) according to the embodiment of the present invention along with the sequence shown in FIG. 9.

Processes in the diagram are started and ended according to user's operations. Receiving a starting operation, the editing device controlling unit 134 displays a list of the production condition information contained in the production condition table 131*c* on the display device (Step S901).

The editing device controlling unit 134 selects the production condition information from the list of the production condition information according to a selection made through the operation device, and sends the selected production condition information and a writing command to the editing device sending unit 133 (Step S902).

The editing device sending unit 133 modulates the production condition information and the writing command received from the editing device controlling unit 134 to a signal in a specific frequency, and sends it to the editing device antenna unit 132. The editing device antenna unit 132 keeps sending a radio wave containing the production condition information in a specific frequency and the writing command to the IC tag 120 for a specific period of time (Step S903). Here, the specific period of time means time sufficiently allowed for the IC tag 120 to replace the production condition information already registered with the newly received production condition information.

The tag antenna unit 121 receives the radio wave containing the production condition information in the specific frequency and the writing command, generates AC electricity, and supplies the AC electricity to the power supply unit 123. The power supply unit 123 generates DC electricity from the AC electricity, and supplies it to the tag sending and receiving unit 122, the tag memory unit 124 and the tag controlling unit 125. The tag sending and receiving unit 122 demodulates the radio wave in the specific frequency received by the tag antenna unit 121, reproduces the production condition information and the writing command, and sends the reproduced production condition information and writing command to the tag controlling unit 125. According to the writing command received from the tag sending and receiving unit 122, the tag controlling unit 125 replaces the production condition information memorized in the tag memory unit 124 with the production condition information received from the tag sending and receiving unit 122 (Step S904).

According to the present embodiment as mentioned above, the IC tag 120 attached to the work in process 100 memorizes the production condition information of the portable telephone 110, the mounting device 140 mounts the components of the portable telephone 110 on the work in process 100 based on the production condition information, and the inspection device 150 inspects the work in process 100, which the components of the portable telephone 110 are mounted, according to the production condition information. Therefore, in this portable telephone production system, since the portable telephone 110 is produced according to an instruction of the IC tag 120 attached to the work in process 100, it is possible to produce plural types of the portable telephone 110 from the work in process 100 without changing setups for the mounting device 140 and the inspection device 150 through a human operation.

Also, the portable telephone 110 is produced based on the production condition information memorized in the IC tag 120 attached to the work in process 100. Therefore, the work in process 100 is authorized to decide the specifications of the portable telephone 110, so a product-driven production system can be realized in the portable telephone production system.

Moreover, the IC tag 120 attached to the work in process 100 memorizes the production condition information of the portable telephone 110, and is attached to the work in process 100 in a detachable way. Therefore, the portable telephone 110 to be produced can be changed by replacing the IC tag 120 attached to the work in process 100. So, the portable telephone 110 to be produced can be changed easily in the present portable telephone production system. For example, when a trial product of the portable telephone 110 is produced, it becomes possible by simply attaching the IC tag 120, which memorizes the production condition information for producing the trial product, to the work in process 100.

Also, according to the present embodiment, the editing device 130 can make the IC tag 120 memorize the production condition information. In the present portable telephone production system, since the portable telephone 110 to be produced can be changed just by having the IC tag 120 memorize its new production condition information, the portable telephone 110 produced can be changed without replacing the IC tag 120 attached to the work in process 100. For example, while the portable telephone 100 equipped with a round antenna is being produced, the portable telephone 110 having a stick type antenna is well sold in a market. In the present portable telephone production system, the portable telephone 110 with the stick type antenna demanded in the market can be easily produced by having the IC tag 120 attached to the work in process 100 memorize the production condition information for producing the portable telephone 110 with the stick type antenna.

Also, according to the present embodiment, the IC tag 120 attached to the work in process 100 memorizes the production condition information of the portable telephone 110. Therefore, the mounting device 140 and the inspection device 150 do not need to memorize the production condition information of the portable telephone 110, workloads of the mounting device 140 and the inspection device 150 are reduced in this portable telephone production system.

Furthermore, according to the present embodiment, the IC tag 120 attached to the work in process 100 memorizes the production condition information of the portable telephone 110, and the mounting device 140 displays contents of the mounting condition data contained in the production condition information through an image. Therefore, the user of the mounting device 140 can confirm the mounting contents through the image, so that the components of the portable telephone 110 can be accurately mounted on the work in process 100 without any errors in the present portable telephone production system.

Also, according to the present embodiment, the IC tag 120 attached to the work in process 100 memorizes the production condition information of the portable telephone 110, and the inspection device 150 displays contents of the inspection condition data contained in the production condition information through characters. Therefore, the user of the inspection device 150 can confirm the content of the inspection, so that the work in process 100 with the components of the portable telephone 110 mounted can be accurately inspected without any errors.

In addition, according to the present embodiment, the editing device 130 can generate new production condition information. Hence, in the present portable telephone production system, any idea for the new portable telephone 110 can be quickly and easily reflected on the production of the portable telephone 110. That is, the system can respond to a market demanding a new portable telephone 110 all the time.

The production line in the present embodiment is illustrated as a production line for producing the portable telephone 110 from the work in process 100, which includes the process to mount the components of the portable telephone 110 on the work in process 100 with an electric component mounted, and the process to inspect the work in process 100 with the components of the portable telephone 110 mounted. However, the portable telephone production system may be executed in a production line that includes some other process for producing the portable telephone 110 from the work in process 100, by having the production line, which produces the portable telephone 110 from the work in process 100, include the other process, having the IC tag 120 memorize the production condition information related to the other process, and having a device related to the production of the portable telephone 110 in the other process contain the same function as that of the mounting device 140. For example, when the work in process 100 for the portable telephone 110 is a printed circuit board, and its production line is for producing the portable telephone 110 from the work in process as the print circuit board or the like, the portable telephone production system can be implemented in the production line that includes a process to mount electric components on the work in process 100 such as the printed circuit board by having the IC tag 120 memorize production condition information related to the process for mounting the electric components on the work in process 100, and having a device for mounting the electric components on the work in process 100 contain functions to read out the production condition information from the IC tag 120 and to mount the electric components on the work in process 100 according to the readout production condition information.

Also, according to the present embodiment, after the process to mount the components of the portable telephone 110 on the work in process 110, the system proceeds to the process to inspect the work in process 100 with the components of the portable telephone 110 mounted. However, the IC tag 120 attached to the work in process 100 may instruct which processes the work in process 100 goes through, by having the production condition information contain information related to a sequence of processes that the work in process 100 should go in a production line including plural processes. For example, when the production line includes a process to mount electric components, a process to mount the components of the portable telephone 110 and an inspection process, it is possible to include information that instructs to "Go to next process for mounting the components of the portable telephone 110 after the process for mounting the electric components, and go to next process for inspection after the process for mounting the components of the portable telephone 110" in the production condition information, so that the IC tag 120 attached to the work in process 100 can instruct the processes that the work in process 100 should go through.

Furthermore, in the present embodiment, the mounting device controlling unit 144 receives the mounting image information from the mounting device memory unit 141 based on the production condition information received from the IC tag 120, and displays contents of the received mounting image information on the display device. But, the mounting device controlling unit 144 may display the contents of the mounting image information received from the IC tag 120 on the display device by having the editing device 130 have functions to memorize the mounting image information and to send the mounting image information to the IC tag 120, having the IC tag 120 have a function to memorize the mounting image information, and having the mounting device 140 have a function to read out the mounting image information from the IC tag 120.

In addition, according to the present embodiment, the inspection device controlling unit 151 displays contents of the inspection condition data in characters. However, by having the inspection device 150 memorize the inspection image information corresponding to the inspection condition data and include a display device that displays the inspection image information with images, the inspection device controlling unit 151 may display the contents of the inspection condition data, which are contained in the production condition information received from the IC tag 120, on the display device with images.

Also, according to the present embodiment, the mounting device controlling unit 144 receives the mounting image information from the mounting device memory unit 141 based on the mounting condition data, which is contained in the production condition information received from the IC tag 120, and displays the contents of the received mounting image information on the display device through the image. However, the mounting device controlling unit 144 may display the contents of the mounting condition data, which is contained in the production condition information received from the IC tag 120, on the display device in characters.

Additionally, in the present embodiment, the mounting device 140 displays the contents of the mounting condition data on the display device through images. But, the mounting device 140 may output the contents of the mounting condition data through sounds by having the mounting device 140 memorizes sound information corresponding to the mounting condition data and includes a sound output device that outputs the contents of the sound information through sounds.

Moreover, in the current embodiment, the inspection device 150 displays the content of the inspection condition data on the display device in characters. However, the inspection device 150 may output the content of the inspection condition data through sounds by having the inspection device 150 memorize the sound information corresponding to the inspection condition data and include a sound output device that outputs the content of the sound information through sounds.

Also, according to the present embodiment, the IC tag 120 that memorizes the production condition information of the portable telephone 110 is attached to the work in process 100 of the portable telephone 110. However, the present invention is not limited to it, as long as the mounting device 140 and the inspection device 150 can specify the work in process 100 designated by the IC tag 120. The IC tag 120 may be attached to a pallet, a container or the like where the work in process 100 is located.

Furthermore, in the present embodiment, the mounting work unit 145 mounts the components of the portable telephone 110 on the work in process 100, and the inspection work unit 152 inspects the work in process 100 with the components of the portable telephone 110 mounted. However, by having the user of the mounting device 140 confirm the content of the mounting condition data displayed on the display device and having the user of the inspection device 150 confirm the content of the inspection condition data displayed on the display device, the user of the mounting device 140 may mount the components of the portable telephone 110 on the work in process 100 and the user of the inspecting device 150 may inspect the work in process 100 with the components of the portable telephone 110 mounted.

Also, in the present embodiment, the mounting work unit 145 memorizes NC data corresponding to the mounting condition data, and the inspection work unit 152 memorizes NC data corresponding to the inspection condition data. However, the mounting device 140 may mount the components of the portable telephone 110 on the work in process 100 according to NC data received from the IC tag 120, and the inspection device 150 may inspect the work in process 100 with the components of the portable telephone 110 mounted, by having the IC tag 120 memorize the NC data corresponding to the mounting condition data and the NC data corresponding to the inspection condition data.

In the present embodiment, production of the portable telephone 110 is given as an example. However, the production system may be applied to production of foods, clothes, chemical products, precision machinery, machine tools, robots, automobiles, air crafts, vessels, and any kinds of industrial products.

As clarified from above, according to the production system related to the present invention, the noncontact IC tag attached to the work in process for the product memorizes the production condition of the product, so that various products may be produced by attaching plural number of the noncontact IC tags memorizing a different production condition are respectively attached to the works in process. Therefore, plural kinds of products can be easily produced and two or more products having different contents of production processes can be easily produced. Also, according to the production system related to the present invention, because the product is produced based on the production condition memorized in the noncontact IC tag attached to the work in process of the product, the new product-driven production system, which allows the work in process to decide specifications of the product, can be provided. In addition, according to the production system related to the present invention, since the noncontact IC tag that memorizes the production condition is attached to the work in process in a detachable way, the product to be produced can be easily changed by replacing the noncontact IC tag attached to the work in process. Also, according to the production system related to the present invention, because the noncontact IC tag attached to the work in process memorizes the production condition of the product, the production device does not need to memorize the production condition of the product, so that a workload of the production device can be lightened. Also, according to the production system related to the present invention, as a new production condition can be generated, any ideas for a new product can be promptly and easily reflected on the production of the portable telephone, and its manufacturers can respond to the market that demands new products all the time.

Therefore, according to the present invention, it is possible provide a production system that can easily produce various products in the production processes, and its practical value is extremely high in the present situation where preference of consumers is diversified and a variety of products are demanded to the manufacturers.

What is claimed is:

1. A production system for a product comprising a noncontact IC tag and a production device, wherein the noncontact IC tag is attached to a work in process of the product, and is configured to store production condition information related to a production method of the product and image data related to the production condition information corresponding to the production condition information, and the production device comprises a production condition information reading unit operable to read out the production condition information from the noncontact IC tag, a production method display unit operable to display the read out production condition information through an image based on the image data, and a production unit operable to change a production condition, based on the read out production condition information, and to produce, according to the changed production condition, the product from the work in process with the noncontact IC tag attached.

2. The production system according to claim 1,
wherein the production device stores image information corresponding to the image data, and the production method display unit displays the content of the production condition information through an image in accordance with the image information corresponding to the image data.

3. The production system according to claim 2,
wherein the production device further includes an image information memory unit operable to store a plurality of the image information, and an image information writing unit operable to write any of the plurality of the image information into the noncontact IC tag.

4. The production system according to claim 3,
wherein the production device further includes an image information generating unit operable to generate new image information.

5. The production system according to claim 4,
wherein the production device further includes a production condition information memory unit operable to store a plurality of the production condition information, and a production condition information writing unit operable to write any of the plurality of the production condition information into the noncontact IC tag.

6. The production system according to claim 5,
wherein the production device further includes a production information generating unit operable to generate new production condition information.

7. The production system according to claim 6,
wherein the production condition information includes mounting condition data related to a mounting condition for a raw material of the product, and
the production unit includes a mounting unit operable to mount the raw material of the product based on the mounting condition data included in the production condition information.

8. The production system according to claim 7,
wherein the production condition information further includes inspection condition data related to a condition of inspection performed on the mounted raw material, and
the production unit includes an inspection unit operable to inspect the mounted raw material based on the inspection condition data included in the production condition information.

9. The production system according to claim 8,
wherein the production device stores NC data corresponding to the mounting condition data, and
the mounting unit mounts the raw material of the product according to the NC data corresponding to the mounting condition data.

10. The production system according to claim 9,
wherein the production device stores NC data corresponding to the inspection condition data, and
the inspection unit inspects the mounted raw material according to the NC data corresponding to the inspection condition data.

11. The production system according to claim 10,
wherein a plurality of actions taken by the production device for mounting the raw material of the product are registered on the NC data corresponding to the mounting condition data.

12. The production system according to claim 11,
wherein a plurality of actions taken by the production device for inspecting the mounted raw material are registered on the NC data corresponding to the inspection condition data.

13. The production system according to claim 12,
wherein the production condition information further includes process condition data related to a sequence of processes performed on the raw material in production of the product, and
the production unit includes a process sequence decision unit operable to decide the sequence of the processes performed on the raw material based on the process condition data included in the production condition information.

14. The production system according to claim 13,
wherein the production device stores NC data corresponding to the process condition data, and
the process sequence decision unit determines the sequence of the processes performed on the raw material according to the NC data corresponding to the process condition data.

15. The production system according to claim 1, wherein the production unit stores NC data corresponding to a plurality of the production condition information, and one of mounts on and inspects, based on the NC data corresponding to the read out production condition information, the work in process with the noncontact IC tag attached.

16. A production method for producing a product from a work in process of the product in a production system comprising a production device and a noncontact IC tag attached to the work in process of the product, wherein the noncontact IC tag includes production condition information related to a production method of the product and image data related to the production condition information corresponding to the production condition information, the production method comprising:
receiving, by the production device the production condition information from the noncontact IC tag;
displaying the received production condition information through an image based on the image data;
changing a production condition based on the received production condition information; and
producing, according to the changed production condition, the product from the work in process with the noncontact IC tag attached.

17. The production method according to claim 16, further comprising writing any of a plurality of the production condition information, which are stored in advance, into the noncontact IC tag.

18. A production system comprising:
a noncontact IC tag and a production device,
the noncontact IC tag being attached to a workpiece being processed by the production system, the noncontact IC tag being configured to store production condition information related to a production of the workpiece; and
the production device comprising a production condition information reading unit configured to read out the production condition information from the noncontact IC tag, and a production unit configured to produce, based on the readout production condition information the product from the workpiece being processed with the noncontact IC tag attached, the production device further comprising a production display unit configured to display the read out production condition information, wherein the noncontact IC tag stores image data related to the production condition information and the production display unit displays the production condition information through an image based on the image data.

19. A computer readable medium storing a computer program for use in a production system that produces a product, the production system comprising a noncontact IC tag attached to an unfinished workpiece of the product that stores image data related to production condition information corresponding to production condition information, and a production device, the program comprising:

a production condition receiving segment that receives production condition information related to a production method of the product from the noncontact IC tag;

a production condition displaying segment that displays the production condition information through an image based on the image data;

a production condition changing segment that changes a production condition based upon the received production condition information; and a production segment that, in accordance with the changed production condition, produces the product from the unfinished workpiece with the noncontact IC tag attached.

* * * * *